US007944100B2

(12) United States Patent
Lemmers, Jr. et al.

(10) Patent No.: US 7,944,100 B2
(45) Date of Patent: May 17, 2011

(54) GENERATOR RECTIFIER ASSEMBLY WITH EASE OF ASSEMBLY FEATURES

(75) Inventors: Glenn C. Lemmers, Jr., Loves Park, IL (US); Scott R. Ganong, Stillman Valley, IL (US); Philip Gillingwater, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 219 days.

(21) Appl. No.: 12/436,185

(22) Filed: May 6, 2009

(65) Prior Publication Data
US 2010/0283357 A1 Nov. 11, 2010

(51) Int. Cl.
*H02K 11/04* (2006.01)
*H02K 15/00* (2006.01)
*H02K 19/36* (2006.01)

(52) U.S. Cl. ....... 310/68 D; 310/68 R; 310/89; 363/126; 29/592.1

(58) Field of Classification Search ................ 310/68 D, 310/68 R, 89; 363/44, 67, 125, 126; 29/592.1; H02K 11/00, 11/04, 19/36
See application file for complete search history.

(56) References Cited

U.S. PATENT DOCUMENTS

| 3,883,716 | A  | * | 5/1975  | Fortune ..................... 219/241 |
| 4,794,510 | A  | * | 12/1988 | Wege ........................ 363/145 |
| 5,006,741 | A  |   | 4/1991  | Schott |
| 5,012,145 | A  |   | 4/1991  | Frantz et al. |
| 5,136,195 | A  |   | 8/1992  | Allen, III et al. |
| 5,773,903 | A  | * | 6/1998  | McCabria et al. .......... 310/68 D |
| 5,796,196 | A  | * | 8/1998  | Johnsen et al. ............. 310/68 D |
| 6,107,711 | A  |   | 8/2000  | Borchert |
| 6,580,187 | B2 |   | 6/2003  | Bradfield |
| 6,661,135 | B2 |   | 12/2003 | Borden |
| 6,777,839 | B2 | * | 8/2004  | Casey et al. ................. 310/68 D |
| 6,914,357 | B2 | * | 7/2005  | Tabatowski-Bush et al. .. 310/71 |
| 7,166,943 | B2 | * | 1/2007  | Johnsen ....................... 310/68 D |
| 7,400,117 | B1 |   | 7/2008  | Rozman et al. |
| 7,486,053 | B2 |   | 2/2009  | Qi et al. |
| 7,511,392 | B2 |   | 3/2009  | Rubbo et al. |
| 2006/0284499 | A1 | * | 12/2006 | Rubbo et al. ................. 310/68 D |
| 2007/0108854 | A1 | * | 5/2007  | Osborn et al. ............... 310/68 D |
| 2010/0283357 | A1 | * | 11/2010 | Lemmers et al. ........... 310/68 D |

* cited by examiner

*Primary Examiner* — Burton Mullins
*Assistant Examiner* — John K Kim
(74) *Attorney, Agent, or Firm* — Carlson, Gaskey & Olds

(57) ABSTRACT

A rectifier assembly includes first and second housings surrounding a pair of electrical rings. Each of the electrical rings communicates with a pin. Bolts secure a spring to hold diodes against an inner wall of the electrical rings. The first housing includes openings opposed to the bolts to allow access to the bolts for tightening the bolts to hold the spring, and bias the diodes against the inner periphery of the electrical rings. A rotor balance assembly, a generator, and a method of assembling a rectifier assembly are also disclosed and claimed.

20 Claims, 8 Drawing Sheets

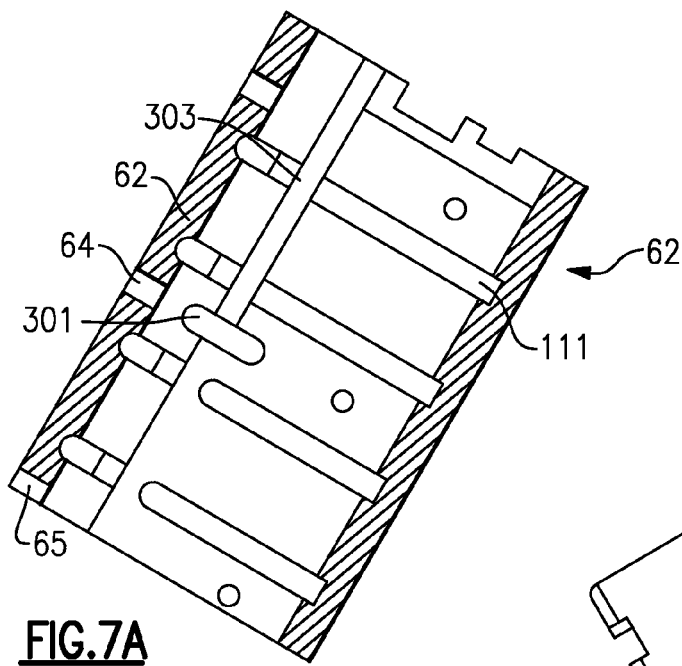
FIG.7A
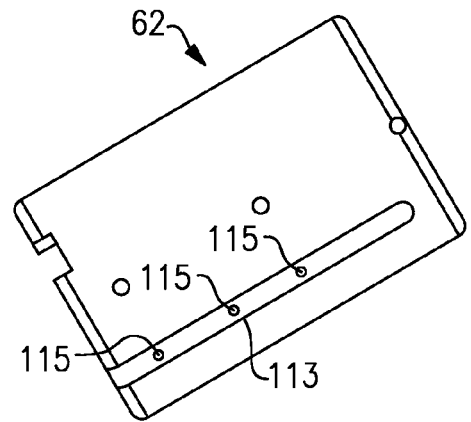
FIG.7B
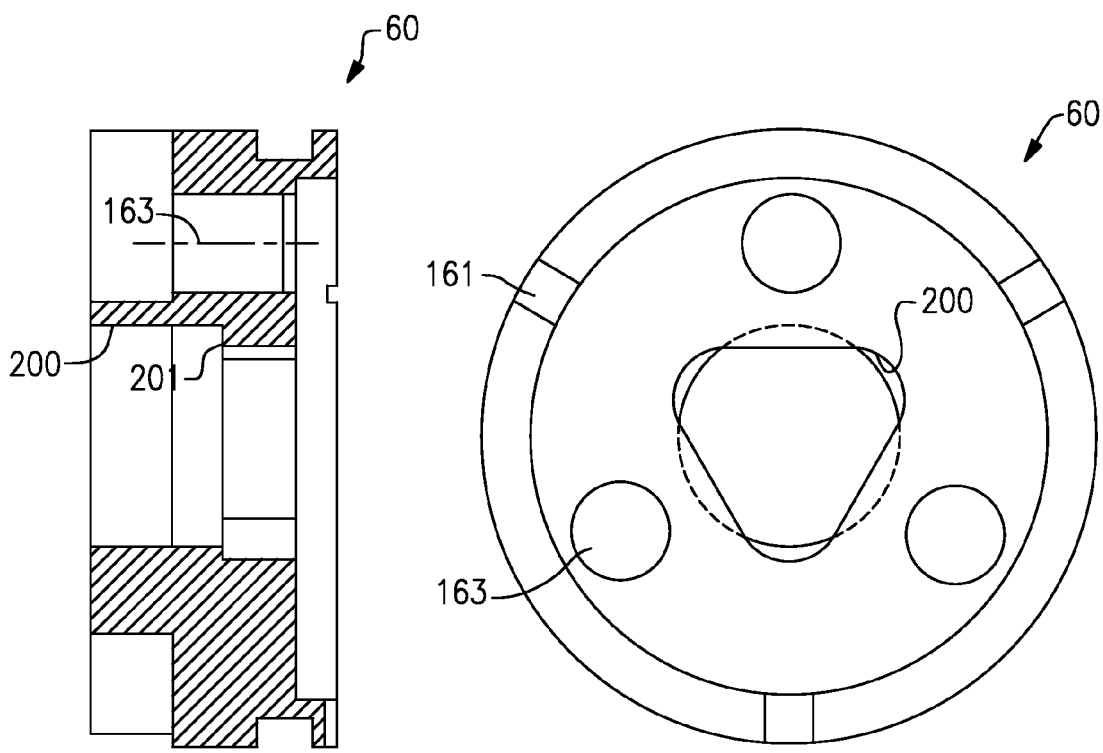
FIG.8A
FIG.8B

US 7,944,100 B2

GENERATOR RECTIFIER ASSEMBLY WITH EASE OF ASSEMBLY FEATURES

BACKGROUND OF THE INVENTION

This application relates to a rectifier assembly for a generator, wherein the rectifier assembly is easily assembled.

Generators are known, and typically include a generator rotor having main windings that are driven to rotate by a source of rotation. As an example, a generator may be driven to rotate by the output of a gas turbine engine. In typical generator operation, a flow of current is supplied to the main windings. The main windings rotate adjacent to a stator, and electricity is generated, and used for various purposes.

In one known type of generator, a so-called exciter rotor rotates adjacent to a stator, and generates current to be delivered to the main windings as a current to facilitate the main generation of electricity.

The current generated by the exciter rotor is typically an AC current and a rectifier is utilized to transform that AC current into a DC current for use by the main windings. In the past, the rectifiers have been somewhat difficult to assemble.

SUMMARY OF THE INVENTION

A rectifier assembly includes first and second housings surrounding a pair of electrical rings. Each of the electrical rings communicates with a pin. Bolts secure a spring to hold diodes against an inner wall of the electrical rings. The first housing includes openings opposed to the bolts to allow access for tightening the bolts to hold the spring, and bias the diodes against the inner periphery of the electrical rings.

A rotor balance assembly includes a main winding on a rotor shaft and an exciter winding on the rotor shaft. A rectifier assembly is received in a bore in the shaft, and includes first and second housings surrounding a pair of electrical rings. Each of the electrical rings communicates with a pin. Bolts secure a spring to hold diodes against an inner wall of the electrical rings. The first housing includes openings opposed to the bolts to allow access for tightening the bolts to hold the spring, and bias the diodes against the inner periphery of the electrical rings.

A generator includes a main stator and a main winding, an exciter rotor and an exciter winding. The main exciter windings rotate with a shaft. The exciter rotor communicates with a rectifier assembly. The rectifier assembly communicates with the main winding and is received in a bore in the shaft. The rectifier assembly includes first and second housings surrounding a pair of electrical rings. Each of the electrical rings communicates with a pin, and bolts to secure a spring to hold diodes against an inner wall of the electrical rings. The first housing includes openings opposed to the bolts to allow access for tightening the bolts to hold the spring, and bias the diodes against the inner periphery of the electrical rings.

A method of assembling a rectifier assembly includes the steps of assembling a plurality of electrical rings and insulators within a housing, and inserting a drive tool through an opening in an outer wall of the housing, and into bolts associated with springs, tightening the bolts by the tool to hold the spring to bias diodes against inner peripheral walls of the electrical rings.

These and other features of the present invention can be best understood from the following specification and drawings, the following of which is a brief description.

BRIEF DESCRIPTION OF THE DRAWINGS

FIG. 7A is a cross-sectional view through a first housing portion.

FIG. 7B is an outer view of the first housing portion.

FIG. 8A is an end view of the second housing portion.

FIG. 8B is a cross-sectional view through the second housing portion.

DETAILED DESCRIPTION OF THE PREFERRED EMBODIMENT

Figure 1:
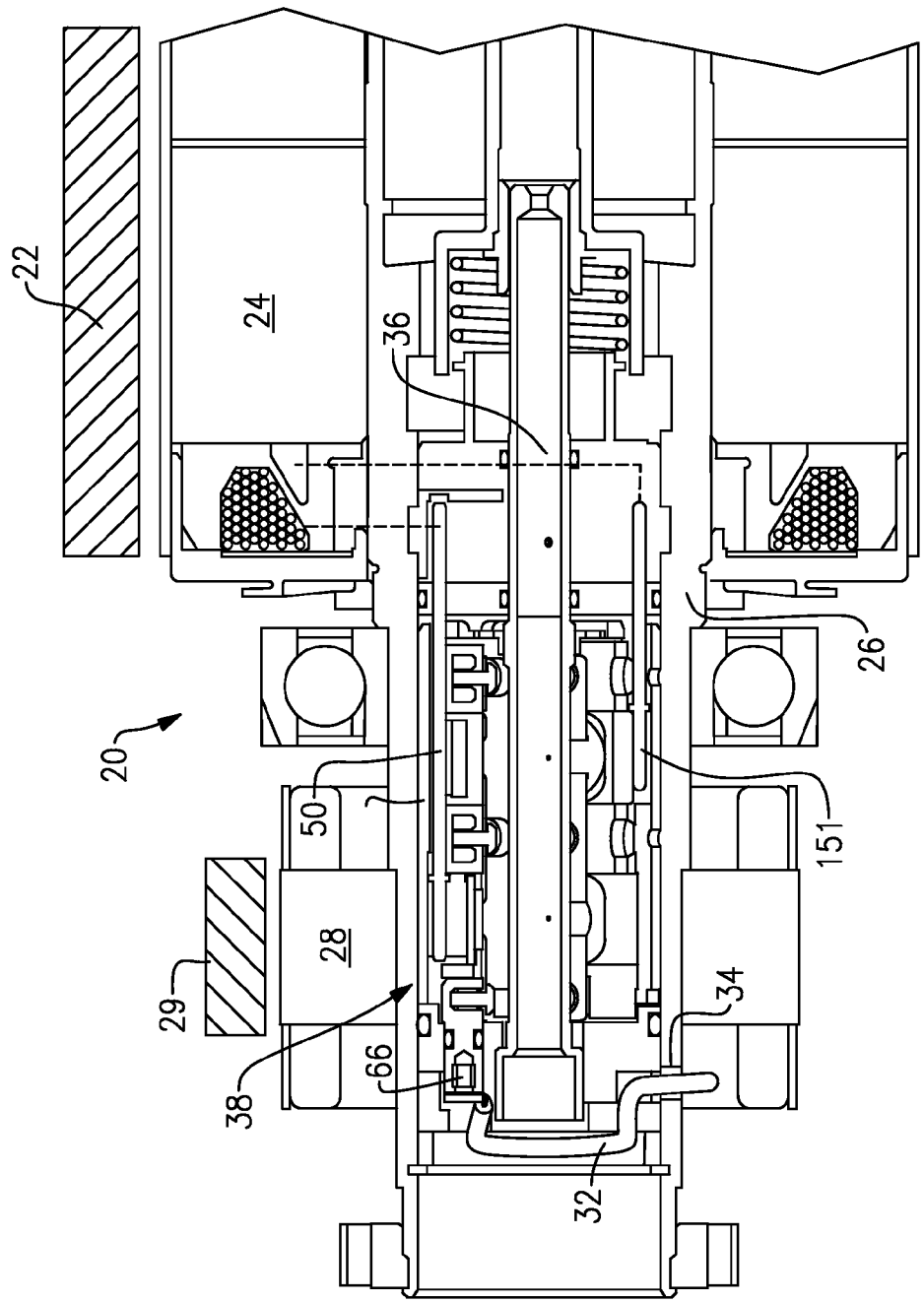
FIG. 1 is a cross-sectional view through a generator.

FIG. 1 shows a generator 20 incorporating a main stator 22 adjacent to main windings 24. A generator shaft 26 is driven to rotate by a source of rotation, which may be a gas turbine engine. An exciter rotor 28 is mounted on the shaft, and rotates adjacent to an exciter stator 29. As known, the rotation of the exciter rotor 28 generates an AC current, which is delivered to the main winding 24 through DC connector pins 50 and 151. Connections are shown schematically from the pins 50 and 151 going to the main windings 24. This portion of the invention is as known in the art. A wire 32 passes through slots 34 in the shaft 26 and is connected to electrical terminals 66. The detail of the generator shaft 26, and the slots 34, are better disclosed in a co-pending U.S. patent application Ser. No. 12/436,161, filed on even date herewith and entitled "Generator Rotor with Improved Hollow Shaft."

A rectifier assembly 38 is shown within an inner bore in the generator shaft 26.

Figure 2A:
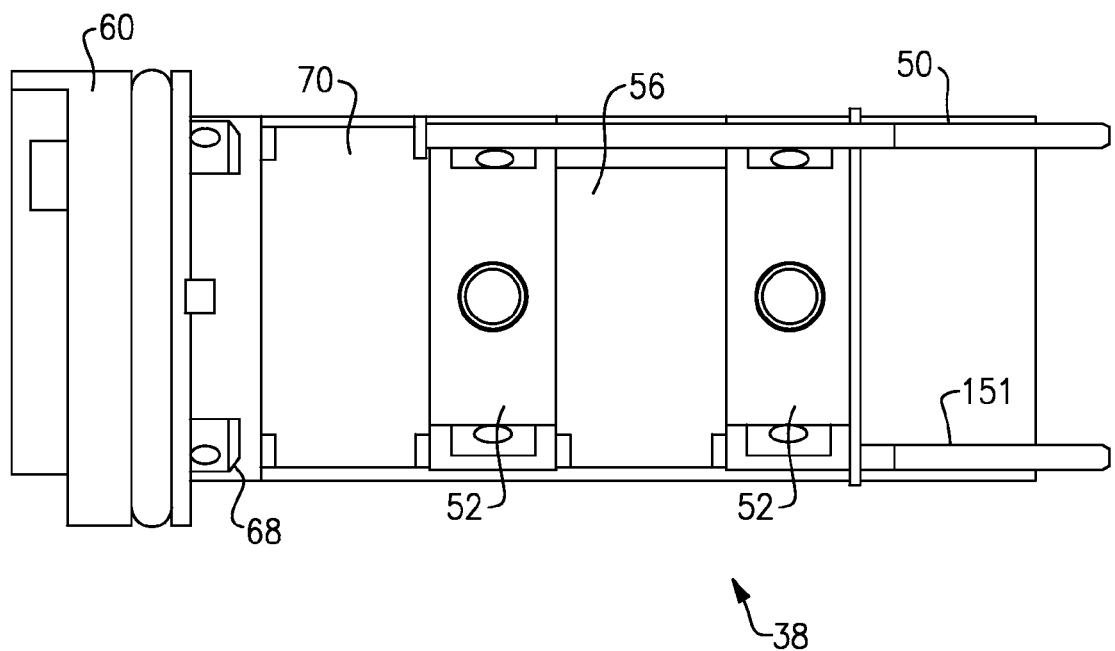
FIG. 2A is a first view showing the main components of the rectifier assembly.

As shown in FIG. 2A, the rectifier assembly 38 incorporates an end housing 60, an insulator 68, a first electrical ring 70, a second insulator 52, a second electrical ring 56, and another insulator 52. As can be seen, the pins 50 and 151 extend beyond insulator 52.

Figure 2B:
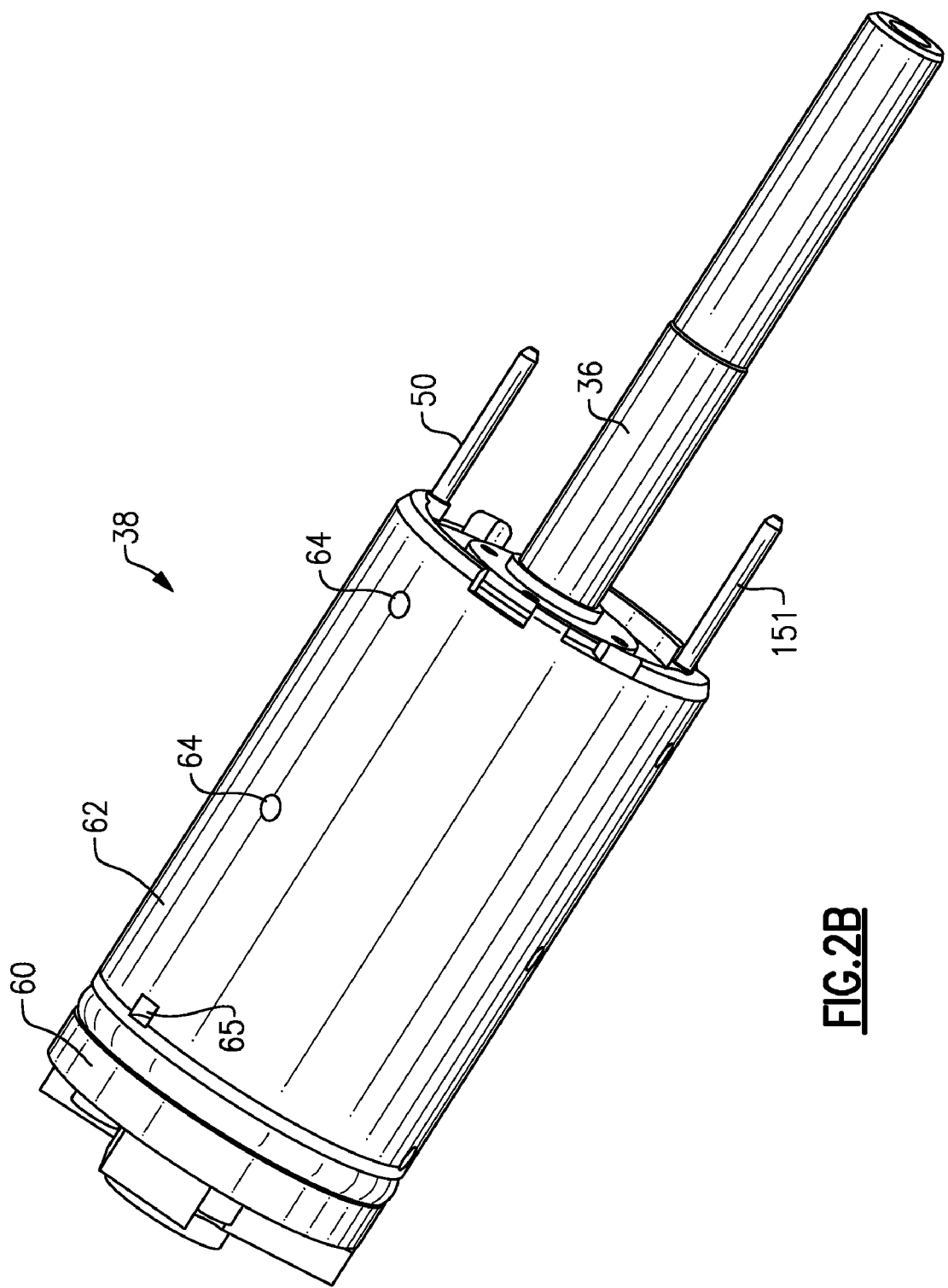
FIG. 2B shows the rectifier assembly.

This assembly is shown in FIG. 2A without the housing portion 62. FIG. 2B shows the housing portion 62 assembled to the housing portion 60. In addition, an oil supply tube 36 is shown in FIG. 2B extending outwardly of the assembly 38. It should be understood that the oil supply tube 36 need not be part of the rectifier assembly 38, and that further, if it is inserted into the assembly, it is inserted after the various screws are tightened, as will be discussed below. Holes 64 and 65 extend through the first housing 62 to allow access to internal screws or bolts.

Figure 3:
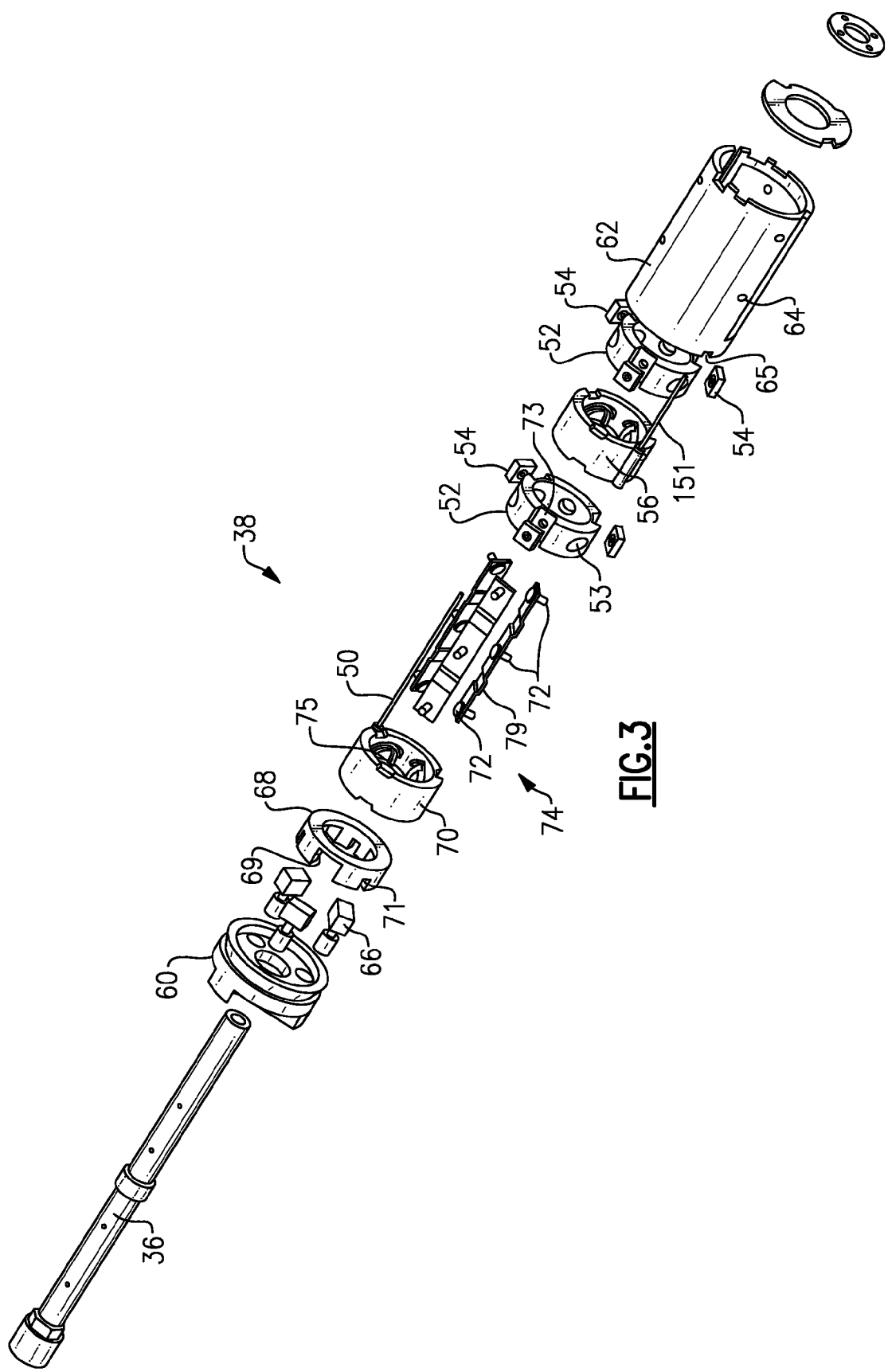
FIG. 3 is an exploded view of the rectifier assembly.

FIG. 3 is an exploded view of the assembly 38, and shows the oil supply tube 36. The housing 60 is shown adjacent to the terminals 66. An insulator 68 includes slots 69 that extend for a generally great circumferential distance and each receive a terminal 66, and smaller slots 71 which provide access to tighten a bolt that is to be received in the terminal 66. The insulator 68 is preferably formed of a plastic. Electrical ring 70 is formed of copper, and includes diodes 75. Spring strips 74 carry three bolts 72, one to be associated with the terminal 66, and the other two to be associated with nuts 54 formed in two spaced insulators 52. Ledges 79 on the springs 74 extend away from a face 81 of the springs that carries the bolts 72. Ledges 79 abut and hold diodes 75 against an inner wall of the electrical rings 70 and 56. As shown, the insulators 52 include holes 53 to allow access to an opposed bolt and slots 73 to receive and hold nuts 54.

Figure 4:
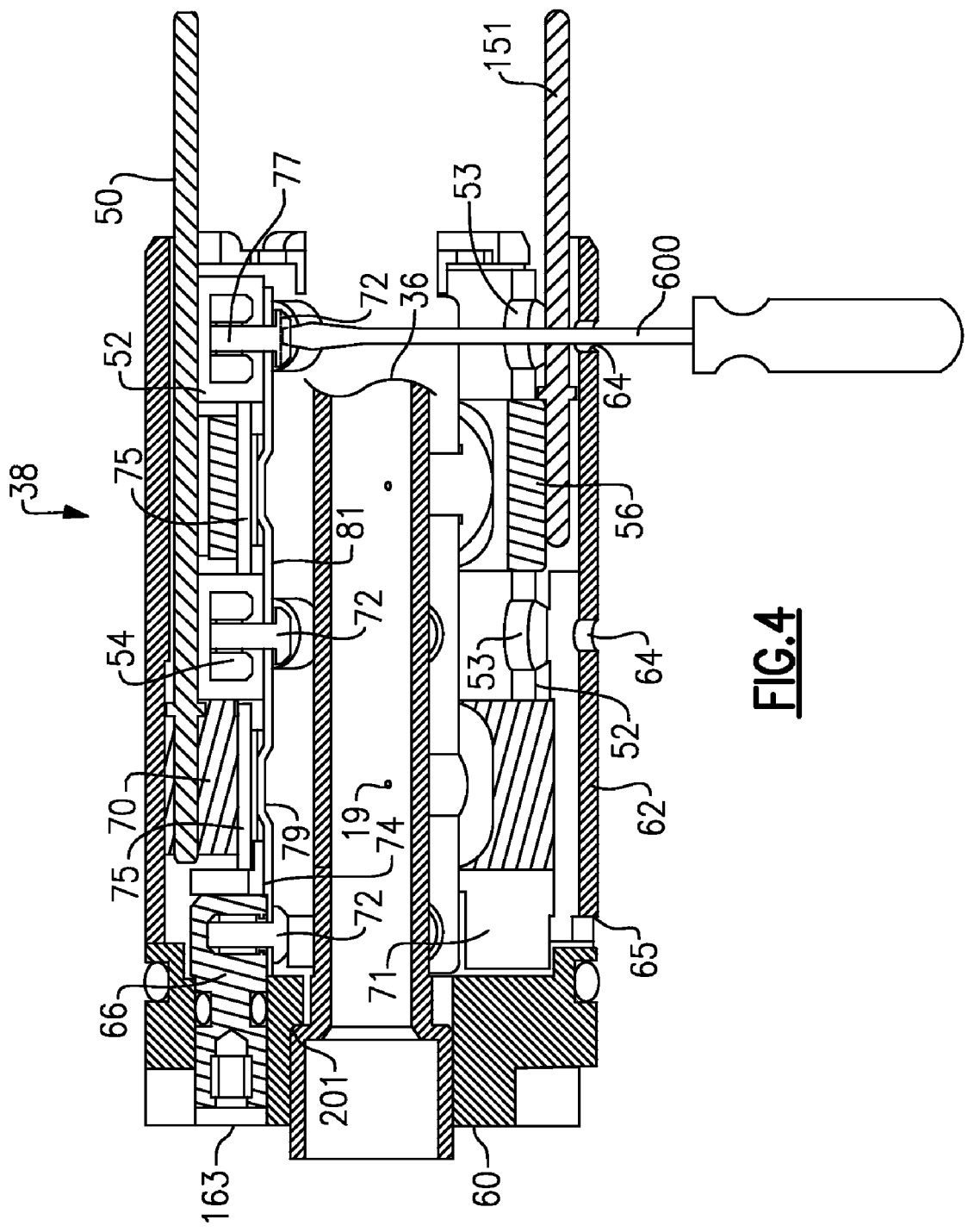
FIG. 4 is a cross-sectional view through the rectifier assembly.

As shown in FIG. 4, the holes 64 are positioned to be opposite of bolts 72 in each of the insulators 52. Similarly, slots 65 at an axial end of the housing 62 allows access to the bolt 72 received in terminals 66. As appreciated from this Figure, the diodes 75 are biased by the ledges 79 against an inner surface of the electrical connection members 70 and 56.

When assembling the diode assembly 38, one initially assembles the housing components onto the second housing 60. The first housing 62 is then brought over the assembly. At that point, the bolts 72 are tightened by moving a tightening tool 600 through the holes 64, 65, 53, and 71. As can be seen, the holes are opposed to the location of the bolts. While the holes can be spaced 180° from the bolts, all that is intended by the term "opposed" is that the holes allow access to the bolts for tightening. After this assembly, the oil tube may then be moved into the housing. As shown on the right hand side, a tool 600 extends through the holes 64 and 53 and is tightening the bolts 72. It should be understood there are three circumferentially spaced sets of the bolts 72 at each of the three axial locations.

By utilizing the two housing portions, and by providing the bolt access holes, the present invention simplifies the assembly when compared to the prior art.

Figure 5:
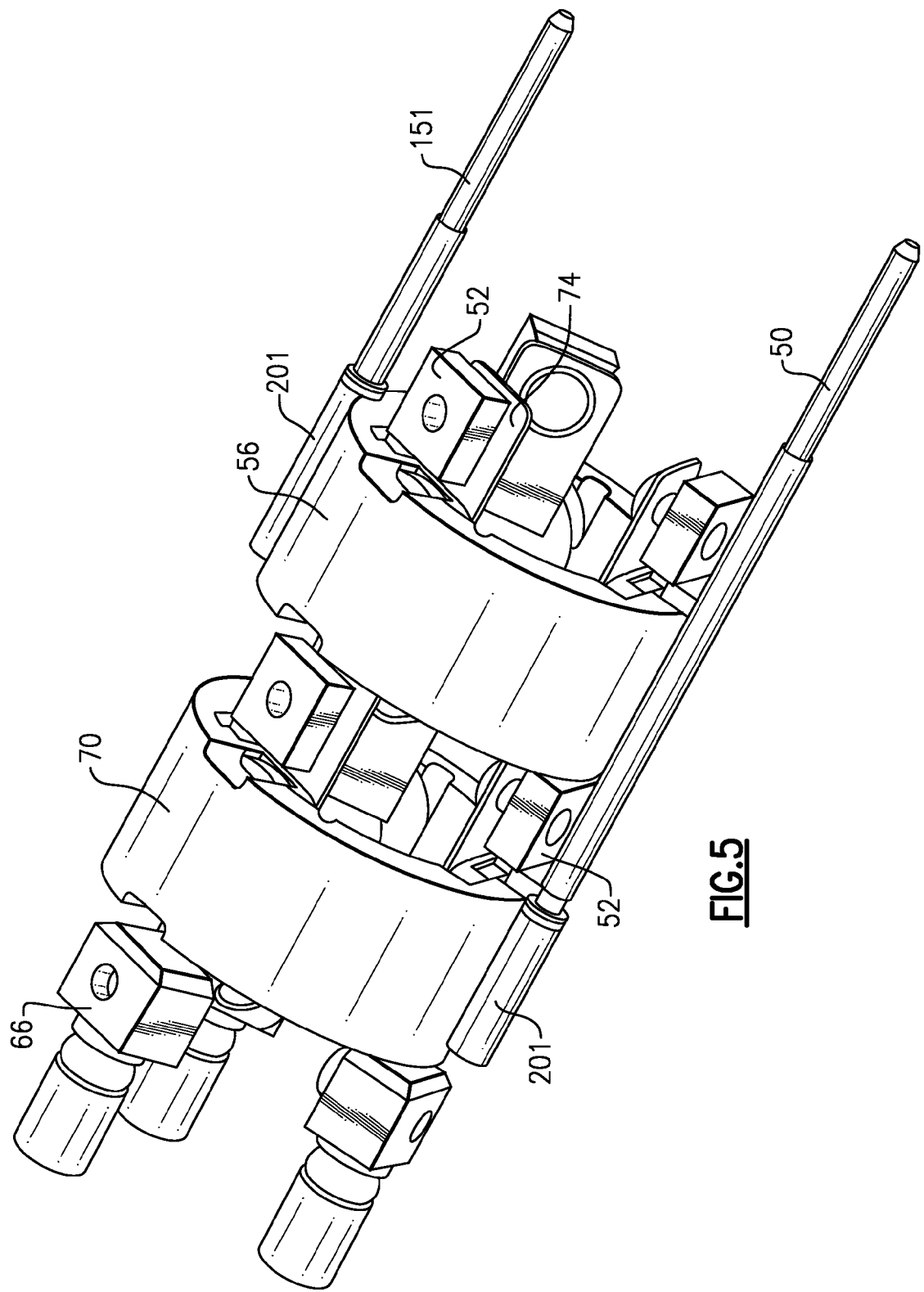
FIG. 5 shows the electrical portions of the rectifier assembly.

FIG. 5 shows the electrical components of the overall rectifier assembly 38. As can be appreciated, the pins 50 and 151 each extend to a slot 201 in their respective electrical rings 70 and 56. The pins provide a positive and negative connection.

Figure 6:
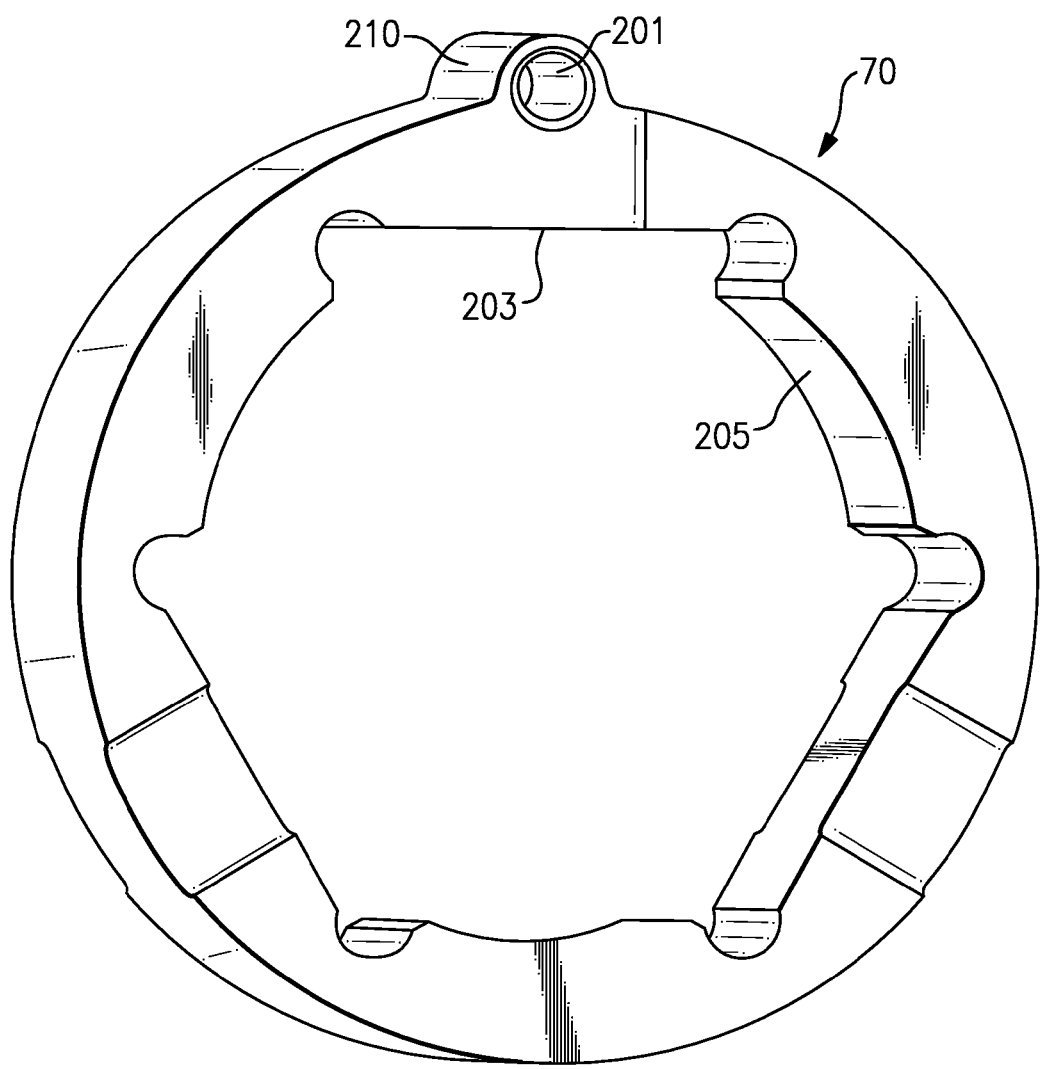
FIG. 6 is a perspective view of a portion of the rectifier assembly.

FIG. 6 shows the electrical ring 70, but the illustration would also apply to the ring 56. As shown, flat surfaces 203 receive a diode, and curved portions 205 are formed circumferentially between the flats 203. An ear 210 includes an opening 201 to receive a pin 50, or 151.

FIG. 7A shows the first housing element 62. As shown in this cross-sectional view, a slot 303 provides room for ear 210. The sot 301 receives the connection pins 151. It should be understood that spaced from this view would be a longer slot 301 to be associated with the longer connection pin 50. Grooves 111 extend circumferentially about the inner periphery to circulate oil.

As shown in FIG. 7B, holes 115 on an outer periphery of the first housing member 62 communicate grooves 111 with outer peripheral tube slots 113.

FIG. 8A shows the second housing member 60 having openings 163 to receive the terminals 66. As shown in FIG. 8B, holes 161 in this housing allow access to the screw threads for tightening. A central tri-lobular hole 200 receives a tri-lobular head of the oil supply tube, to properly position the oil supply tube. Of course, other non-cylindrical shapes may be utilized to properly position the oil supply tube. A ledge 201, as shown in FIG. 8B, provides a stop for the head on the oil supply tube. In this way, the oil supply tube is properly positioned relative to the remainder of the assembly such that oil holes 19 in the oil supply tube are aligned with the diodes 75 (see FIG. 4).

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A rectifier assembly comprising:
   first and second housings surrounding a pair of electrical rings, each of said electrical rings communicating with a pin, and bolts securing a spring to hold diodes against an inner wall of said electrical rings, and said first housing including openings opposed to said bolts to allow access for tightening said bolts to hold said spring, and bias said diodes against the inner periphery of said electrical rings.

2. The rectifier assembly as set forth in claim 1, wherein there are intermediate insulators between said electrical rings, and said insulators receiving said bolts, and including slots at an outer periphery to receive nuts into which said bolts are tightened.

3. The rectifier assembly as set forth in claim 2, wherein connection terminals are provided at an axial end of said rectifier assembly and for receiving a wire from an exciter rotor, said connection terminals also including a screw threaded area which receives a bolt holding said spring.

4. The rectifier assembly as set forth in claim 3, wherein said spring extends axially, and carries three bolts, and has ledges intermediate a location of each of said bolts, and said ledges extend toward an inner peripheral wall of said electrical rings to bias said diodes against said inner wall.

5. The rectifier assembly as set forth in claim 1, wherein said insulators also have holes to allow access.

6. The rectifier assembly as set forth in claim 1, wherein said second housing including a central bore with a non-cylindrical shape to receive an oil supply tube.

7. The rectifier assembly as set forth in claim 6, wherein said second housing including a cylindrical bore portion inward of said non-cylindrical shaped bore to allow passage of said oil supply tube.

8. The rectifier assembly as set forth in claim 1, wherein an inner wall of said first housing includes an axially extending slot to allow passage of at least one of the pins, and a slot to allow an ear associated with one of said electrical rings to be received within said second housing.

9. The rectifier assembly as set forth in claim 1, wherein there are three of said springs spaced circumferentially.

10. A rotor balance assembly comprising:
    a main winding on a rotor shaft;
    an exciter winding on said rotor shaft; and
    a rectifier assembly received in a bore in said shaft, and including first and second housings surrounding a pair of electrical rings, each of said electrical rings communicating with a pin, and bolts securing a spring to hold diodes against an inner wall of said electrical rings, and said first housing including openings opposed to said bolts to allow access for tightening said bolts to hold said spring, and bias said diodes against the inner periphery of said electrical rings.

11. The rotor balance assembly as set forth in claim 10, wherein there are intermediate insulators between said electrical rings, and said insulators receiving said bolts, and including slots at an outer periphery to receive nuts into which said bolts are tightened.

12. The rotor balance assembly as set forth in claim 11, wherein connection terminals are provided at an axial end of said rectifier assembly and receive a wire from said exciter rotor, said connection terminals also including a screw threaded area which receives a bolt holding said spring.

13. The rotor balance assembly as set forth in claim 12, wherein said spring extends axially, and carries three bolts, and has ledges intermediate a location of each of said bolts, and said ledges extend toward an inner peripheral wall of said electrical rings to bias said diodes against said inner wall.

14. The rotor balance assembly as set forth in claim 11, wherein said insulators also have holes to allow access.

15. The rotor balance assembly as set forth in claim 10, wherein an inner wall of said first housing includes an axially extending slot to allow passage of at least one of the pins, and a slot to allow an ear associated with one of said electrical rings to be received within said second housing.

16. A generator comprising:
a main stator and a main winding;
an exciter rotor and an exciter winding, said main exciter windings rotating with a shaft;
said exciter rotor communicating with a rectifier assembly, said rectifier assembly communicating with said main winding and received in a bore in said shaft; and
said rectifier assembly including first and second housings surrounding a pair of electrical rings, each of said electrical rings communicating with a pin, and bolts securing a spring to hold diodes against an inner wall of said electrical rings, and said first housing including openings opposed to said bolts to allow access for tightening said bolts to hold said spring, and bias said diodes against the inner periphery of said electrical rings.

17. The generator as set forth in claim 16, wherein there are intermediate insulators between said electrical rings, and said insulators receiving said bolts, and including slots at an outer periphery to receive nuts into which said bolts are tightened.

18. The generator as set forth in claim 17, wherein connection terminals are provided at an axial end of said rectifier assembly and receive a wire from said exciter rotor, said connection terminals also including a screw threaded area which receives a bolt holding said spring.

19. The generator as set forth in claim 15, wherein said spring extends axially, and carries three bolts, and has ledges intermediate a location of each of said bolts, and said ledges extend toward an inner peripheral wall of said electrical rings to bias said diodes against said inner wall.

20. A method of assembling a rectifier assembly comprising the steps of:
(a) assembling a plurality of electrical rings and insulators within a housing; and
(b) inserting a drive tool through an opening in an outer wall of said housing, and into bolts associated with springs, tightening said bolts by the tool to hold the spring to bias diodes against inner peripheral walls of the electrical rings.

* * * * *